United States Patent
Dunne et al.

(10) Patent No.: US 11,429,255 B2
(45) Date of Patent: *Aug. 30, 2022

(54) IMPAIRMENT-ADAPTIVE ELECTRONIC DATA INTERACTION SYSTEM

(71) Applicant: INTERNATIONAL BUSINESS MACHINES CORPORATION, Armonk, NY (US)

(72) Inventors: Jonathan Dunne, Dungarvan (IE); Paul B. French, Cork (IE); James P. Galvin, Jr., Georgetown, KY (US); Patrick J. O'Sullivan, Ballsbridge (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

This patent is subject to a terminal disclaimer.

(21) Appl. No.: 16/423,085

(22) Filed: May 27, 2019

(65) Prior Publication Data

US 2019/0278445 A1 Sep. 12, 2019

Related U.S. Application Data

(63) Continuation of application No. 14/165,867, filed on Jan. 28, 2014, now Pat. No. 10,324,593.

(51) Int. Cl.
*G06F 3/0484* (2022.01)
*G06F 3/048* (2013.01)
(Continued)

(52) U.S. Cl.
CPC ............ *G06F 3/0484* (2013.01); *G06F 3/048* (2013.01); *G06F 9/451* (2018.02); *G09B 21/005* (2013.01);
(Continued)

(58) Field of Classification Search
CPC .. G09B 21/006; G09B 21/007; G09B 21/005; G09B 21/001; G09G 2340/0442;
(Continued)

(56) References Cited

U.S. PATENT DOCUMENTS 6,453,170 B1 9/2002 List
6,771,302 B1 8/2004 Nimri
(Continued)

FOREIGN PATENT DOCUMENTS

WO 2001024576 A1 4/2001

OTHER PUBLICATIONS

U.S. Appl. No. 14/165,867, Non-Final Office Action, dated May 31, 2016, 14 pg.
(Continued)

*Primary Examiner* — Jennifer N Welch
*Assistant Examiner* — Reji Kartholy
(74) *Attorney, Agent, or Firm* — Cuenot, Forsythe & Kim, LLC (57) ABSTRACT

A system for dynamically adjusting content for an interaction impairment can include a data provider, an end-user electronic device, a user identification module, and a data adjustment module. The data provider can be capable of providing access to electronic data. One or more characteristics of the electronic data can be incompatible with an impairment of an impaired user. The end-user electronic device can be configured to allow the impaired user to interact with electronic data. The user identification module can be configured to identify an identity of the impaired user and/or the impairment of the impaired user. The data adjustment module can be configured to automatically adjust incompatible characteristics of the electronic data prior to presentation by the end-user electronic device. This adjust-
(Continued)

ment can increase the ability of the impaired user to utilize the electronic data with the end-user electronic device.

15 Claims, 5 Drawing Sheets

(51) Int. Cl.
    *G09B 21/00*     (2006.01)
    *G06F 9/451*     (2018.01)
    *H04N 1/00*     (2006.01)
    *G06F 3/00*     (2006.01)

(52) U.S. Cl.
    CPC .............. *G06F 3/002* (2013.01); *G06F 3/007* (2013.01); *G09B 21/001* (2013.01); *H04N 1/0035* (2013.01); *H04N 1/00127* (2013.01)

(58) Field of Classification Search
    CPC ........ G06F 3/0484; G06F 9/451; G06F 3/048; G06F 3/002; G06F 3/007; H04N 1/00127; H04N 1/0035
    See application file for complete search history.

(56) References Cited

U.S. PATENT DOCUMENTS

| | | | |
|---|---|---|---|
| 6,985,524 B1 | 1/2006 | Borchers | |
| 7,181,297 B1* | 2/2007 | Pluvinage | ............ A61B 5/0002 |
| | | | 381/60 |
| 8,615,596 B1 | 12/2013 | Upadhyay | |
| 8,630,633 B1* | 1/2014 | Tedesco | .................... A61F 4/00 |
| | | | 434/132 |
| 10,324,593 B2 | 6/2019 | Dunne et al. | |
| 10,338,784 B2 | 7/2019 | Dunne et al. | |
| 2003/0095705 A1 | 5/2003 | Weast | |
| 2003/0218643 A1 | 11/2003 | Sakata | |
| 2004/0073432 A1 | 4/2004 | Stone | |
| 2004/0143430 A1 | 7/2004 | Said | |
| 2004/0186852 A1* | 9/2004 | Rosen | ................... G06Q 10/10 |
| 2005/0134800 A1 | 6/2005 | Kim | |
| 2006/0139312 A1 | 6/2006 | Sinclair, II | |
| 2006/0189278 A1* | 8/2006 | Scott | ................. H04M 1/72588 |
| | | | 455/90.3 |
| 2007/0216712 A1 | 9/2007 | Louch | |
| 2008/0040116 A1* | 2/2008 | Cronin | ................ G10L 21/0364 |
| | | | 181/129 |
| 2008/0256575 A1 | 10/2008 | Raju | |
| 2009/0249244 A1 | 10/2009 | Robinson | |
| 2010/0171886 A1 | 7/2010 | Anderson | |
| 2012/0254779 A1 | 10/2012 | Ollivierre | |
| 2013/0257849 A1 | 10/2013 | Doherty | |
| 2013/0326360 A1 | 12/2013 | Chuang | |
| 2014/0365906 A1 | 12/2014 | Willis | |
| 2014/0379343 A1* | 12/2014 | Karimi-Cherkandi | ....................... H04M 1/2475 |
| | | | 704/246 |
| 2015/0177969 A1 | 6/2015 | Stoufer | |
| 2015/0212677 A1 | 7/2015 | Dunne | |
| 2015/0212680 A1 | 7/2015 | Dunne | |
| 2019/0278446 A1 | 9/2019 | Dunne et al. | |

OTHER PUBLICATIONS

U.S. Appl. No. 14/165,867, Final Office Action, dated Oct. 20, 2016, 13 pg.
U.S. Appl. No. 14/165,867, Examiner's Answer, dated Jul. 14, 2017, 13 pg.
U.S. Appl. No. 14/165,867, Decision on Appeal, dated Apr. 4, 2018, 6 pg.
U.S. Appl. No. 14/165,867, Notice of Allowance, dated Jul. 30, 2018, 8 pg.
U.S. Appl. No. 14/165,867, Notice of Allowance, dated Feb. 8, 2019, 7 pg.
U.S. Appl. No. 14/547,642, Non-Final Office Action, dated May 27, 2016, 11 pg.
U.S. Appl. No. 14/547,642, Final Office Action, dated Oct. 21, 2016, 11 pg.
U.S. Appl. No. 14/547,642, Examiner's Answer, dated Jul. 14, 2017, 10 pg.
U.S. Appl. No. 14/547,642, Decision on Appeal, dated Apr. 2, 2018, 6 pg.
U.S. Appl. No. 14/547,642, Notice of Allowance, dated Jul. 30, 2018, 8 pg.
U.S. Appl. No. 14/547,642, Notice of Allowance, dated Feb. 25, 2019, 7 pg.
U.S. Appl. No. 16/423,097, Non-Final Office Action, dated Sep. 18, 2019, 7 pg.

* cited by examiner

IMPAIRMENT-ADAPTIVE ELECTRONIC DATA INTERACTION SYSTEM

BACKGROUND

The present invention relates to the field of data interaction and, more particularly, to an impairment-adaptive electronic data interaction system.

It is now commonplace for people to interact with electronic data, often referred to as content, on a daily basis; for individual and/or business purposes. Portable electronic devices like smartphones and tablet computers allow people to interact with desired data more often and in more places. As a result, the amount of electronic data, in its various forms (e.g., documents, applications, videos, Web pages, etc.), is ever-increasing in the world.

Content is created with a target demographic in mind. This target demographic is often broad (e.g., youth, parents, males, females, etc.) and tends to overlook the ability of the demographic to adequately interact with the content. For example, the chromatic scheme used on a Web page is often selected based on technical factors (i.e., the pixel hue rendering is supported properly by a variety of browsers or devices), psychological factors (i.e., the background has a calming effect), and/or taste (i.e., the author likes red). While the choice of RGB properties for the Web page will not affect the majority of users, those having a visual impairment like an inability to distinguish red and green will be at a disadvantage. These chroma choices are capable of rendering the entire Web page unusable to a visually-impaired user.

Unless impaired users are the target demographic, most content is created without consideration for impaired users. Content created by large companies is more likely to offer different modes or alternate versions to accommodate impaired users. While this is appreciated, user impairments are often too specific to be handled in a general manner. For example, a software application includes a mode for chroma insensitive users. There are four types of chroma impairments (i.e., red, green, blue, and total) and each user, even if of the same type, will have different levels of severity.

BRIEF SUMMARY

One aspect of the present invention can include a system for dynamically adjusting content for an interaction impairment. Such a system can include a data provider, an end-user electronic device, a user identification module, and a data adjustment module. The data provider can be capable of providing access to electronic data. One or more characteristics of the electronic data can be incompatible with an impairment of an impaired user, adversely affecting the ability of the impaired user to utilize the electronic data. The end-user electronic device can be configured to allow the impaired user to interact with electronic data. The user identification module can be configured to identify an identity of the impaired user and/or the impairment of the impaired user. The data adjustment module can be configured to automatically adjust incompatible characteristics of the electronic data prior to presentation by the end-user electronic device. This adjustment can increase the ability of the impaired user to utilize the electronic data with the end-user electronic device.

Another aspect of the present invention can include a method for dynamically adjusting content for an interaction impairment. Such a method can begin with the identification of an impairment associated with an impaired user by an impairment-adaptive data interaction system. The impairment-adaptive data interaction system can be a computing system having components that support interaction of the impaired user with electronic data. The impairment can affect an ability of the impaired user to interact with electronic data. The impairment can be defined within an impairment profile associated with the impaired user. The impairment profile can express acceptable limit values for incompatible data characteristics and/or the means to handle incompatible data characteristics. In response to a data request, electronic data can be received from a data provider. One or more characteristics of the electronic data can be incompatible with the impairment of the impaired user. An incompatible characteristic can adversely affect the ability of the impaired user to utilize the electronic data. The received electronic data can be automatically processed to adjust the one or more incompatible characteristics, reducing the adverse effect of the incompatible characteristics upon the ability of the impaired user to utilize the electronic data. The processed electronic data can then be provided to the impaired user for interaction. It can be unnecessary for the impaired user to make additional modifications to the processed electronic data to compensate for their impairment.

Yet another aspect of the present invention can include a computer program product that includes a computer readable storage medium having embedded computer usable program code. The computer usable program code can be configured to receive electronic data from a data provider. One or more characteristics of the electronic data can be incompatible with an impairment of an impaired user, adversely affecting an ability of the impaired user to utilize the electronic data. The computer usable program code can be configured to automatically process the received electronic data to adjust the incompatible characteristics, reducing the adverse effect of the incompatible characteristics upon the ability of the impaired user to utilize the electronic data. The computer usable program code can be configured to provide the processed electronic data to the impaired user for interaction. It can be unnecessary for the impaired user to make additional modifications to the processed electronic data to compensate for their impairment.

DETAILED DESCRIPTION

The present invention discloses a solution for dynamically and automatically adjusting electronic data for a user's impairment. A user having an impairment that affects their ability to interact with electronic data can utilize an impairment-adaptive data interaction system. The impairment-adaptive data interaction system can be a computing system that automatically adjusts received electronic data to compensate for the user's impairment. The user's impairment can be defined for the impairment-adaptive data interaction system in a user impairment profile.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
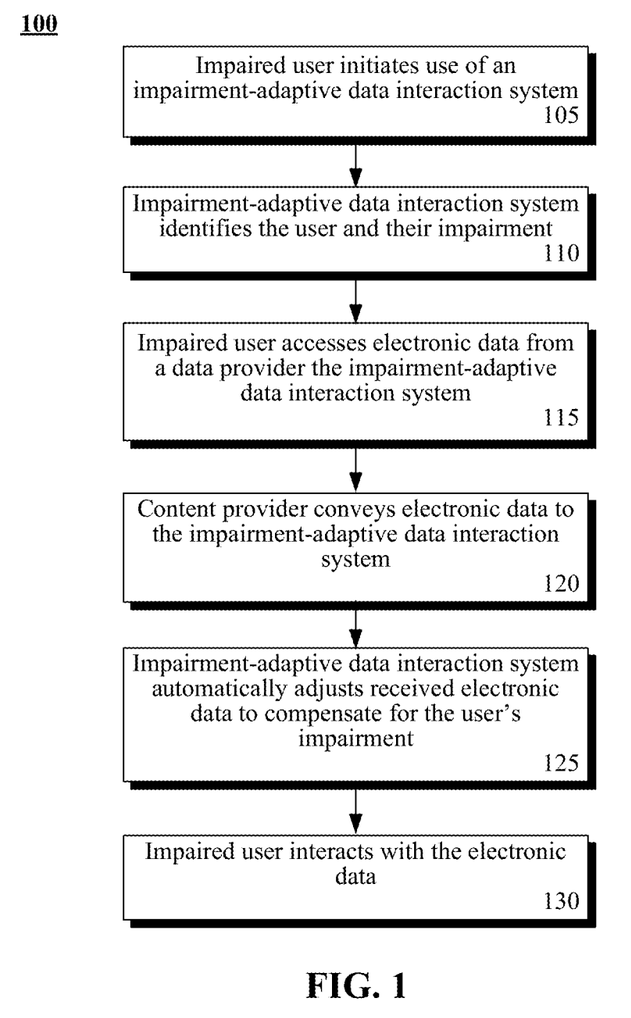
FIG. 1 is a flowchart of a method describing the general use of an impairment-adaptive data interaction system by an impaired user in accordance with embodiments of the inventive arrangements disclosed herein.

FIG. 1 is a flowchart of a method 100 describing the general use of an impairment-adaptive data interaction system by an impaired user in accordance with embodiments of the inventive arrangements disclosed herein. Method 100 can begin in step 105 where the user initiates use of the impairment-adaptive data interaction system.

The term "impaired user", as used herein, can refer to a person having an impairment that results in a decreased ability to interact with electronic data using an end-user electronic device. Examples of an impaired user can include, but are not limited to, an age-advanced person with agerelated hearing loss, a visually-impaired person, a person having a condition that causes decreased fine motor skills, a person with epilepsy, and the like. The impairment of the impaired user can adversely affect their ability to interact with electronic data created for the general public.

For example, it can be difficult for an impaired user having a form of chroma-impairment to utilize (i.e., read, navigate, etc.) Web pages that use colors that they are unable to differentiate or recognize. As another example, a video sample made by a non-professional on a Web site can be unusable to a hearing impaired user, if the video sample does include a closed captioning option.

The impairment-adaptive data interaction system can represent one or more electronic devices or a computing system used by the impaired user for data interaction. For example, the impairment-adaptive data interaction system can be a laptop computer belonging to the impaired user.

The impairment-adaptive data interaction system can identify the impaired user and their impairment in step 110. The identification process of step 110 can be complementary to the impaired user's impairment. That is, the identification process would not include speech recognition if the user has a speech impairment.

In step 115, the impaired user can use the impairment-adaptive data interaction system to access electronic data from a data provider. For example, the impaired user can access a Web page on their computer. It is important to note that the electronic data being accessed in step 115 can lack compensation for the impairment of the impaired user.

The content provider can convey the requested electronic data to the impairment-adaptive data interaction system in step 120. In step 125, the impairment-adaptive data interaction system can automatically adjust the received electronic data to compensate for the user's impairment. Alternately, step 125 can be performed by the content provider prior to the conveyance of the data to the impairment-adaptive data interaction system. The impaired user can then interact with the electronic data in step 130.

Without the use of the impairment-adaptive data interaction system, the impaired user would have been required to manually analyze and adjust the electronic data in order to make the electronic data usable. The impairment-adaptive data interaction system can automate this time-consuming process, increasing the impaired user's accessibility to more electronic data.

Figure 2:
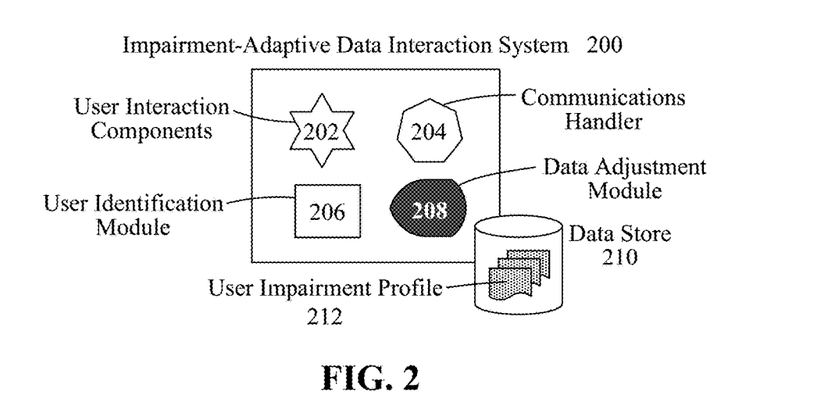
FIG. 2 is a general functional block diagram of an impairment-adaptive data interaction system in accordance with an embodiment of the inventive arrangements disclosed herein.

FIG. 2 is a general functional block diagram of an impairment-adaptive data interaction system 200 in accordance with embodiments of the inventive arrangements disclosed herein. The impairment-adaptive data interaction system 200 can be utilized within the context of method 100.

The impairment-adaptive data interaction system 200 can represent various computing systems or electronic devices (hardware and software) that have been configured to automatically modify electronic data 240 and 275 that is incompatible with an impairment of an impaired user 225 and 255. Functionality of the impairment-adaptive data interaction system 200 can be centralized, as shown in system 220 of FIG. 2A, or distributed, as shown in system 250 of FIG. 2B. The functional elements of the impairment-adaptive data interaction system 200 can include user interaction components 202, a communications handler 204, a user identification module 206, a data adjustment module 208, and a data store 210 containing a user impairment profile 212.

The user interaction components 202 can represent a variety of data interaction methods and/or devices that allow an impaired user 225 and 255 to interact with electronic data 240 and 275. The type of user interaction components 202 can vary per device and/or specific implementation of the impairment-adaptive data interaction system 200. Examples of user interaction components 202 can include, but are not limited to, displays, touchscreens, peripheral input devices (e.g., a mouse, keyboard, trackball, etc.), microphones, speakers, speech recognition software, text-to-speech software, assistive technology devices (e.g., footmice, sip-and-puff devices, eye-tracking devices, braille embossers, etc.).

The user interaction components 202 can be integrated components of a device or can be connected to a device that is part of the impairment-adaptive data interaction system 200 like the end-user device 230 of system 250.

The communications handler 204 can be the hardware and/or software necessary for the impairment-adaptive data interaction system 200 to send and receive electronic data 240 and 275 over a network 245 and 280, when required. For example, the communications handler 204 can include multiple transceivers and the ability to encode/decode electronic data 240 and 275 for different communications protocols.

The user identification module 206 can represent the hardware and/or software required to identify an impaired user 225 and 255. The user identification module 206 can utilize a variety of identification methods commensurate with the user interaction components 202 and the impaired user 225 and 255.

For example, the user identification module 206 can use a digital camera 202 of a smartphone 200 and facial recognition software to determine the identity of the impaired user 225 and 255.

The identification data captured by the user identification module 206 can be correlated to a user impairment profile 212. The user impairment profile 212 can define the impairment of the impaired user 225 and 255 so as to be understandable by the impairment-adaptive data interaction system 200. That is, the user impairment profile 212 can define acceptable limit values for various characteristics or properties of electronic data 240 and 275 and/or designate a specific type of processing that the electronic data 240 and 275 should undergo to increase its usability by the impaired user 225 and 255.

For example, the user impairment profile 212 can define acceptable RGB (red, green, blue) values or a specific hue filter to apply to images before displaying to a chroma-impaired user 225 and 255.

It should be noted that the user impairment profile 212 can provide a level of granularity that is lacking in existing approaches to data modifications that target impaired users 225 and 255. That is, the same type of impairment can be experienced differently by impaired users 225 and 255. For example, the "color-blind" mode of a software application can attempt to compensate for red-green insensitivity. However, each red-green distinguishment-impaired user 225 and 255 can have varying degrees of red-green impairment, and this general approach can be ineffective for some impaired user 225 and 255. Further, a red-green impairment mode cannot help impaired users 225 and 255 who have total or blue chroma insensitivity.

The impairment-adaptive data interaction system 200 can include a user interface (not shown) to allow the impaired user 225 and 255 to enter data for the user impairment profile 212. Such a user interface can include a wizard to assist the impaired user 225 and 255 in defining the limits of their impairment.

In another contemplated embodiment, the impairment-adaptive data interaction system 200 can learn the impairment of the impaired user 225 and 255 over time by observing how the impaired user 225 and 255 interacts with electronic data 240 and 275. The observations can then be recorded to form the user impairment profile 212. For example, a hearing-impaired user 225 and 255 can increase the volume of audio until it is at a desired level. The impairment-adaptive data interaction system 200 can then record the user-selected volume as a minimum value in the user impairment profile 212 for use with subsequent audio playback.

In another embodiment, the data store 210 containing the user impairment profile 212 can be a portable media storage device capable of conveying the user impairment profile 212 to the impairment-adaptive data interaction system 200. For example, the user identification module 206 can utilize radio-frequency identification (RFID) and the user impairment profile 212 can be stored in an RFID tag 210 worn or presented by the impaired user 225 and 255.

The data adjustment module 208 can represent the hardware and/or software necessary to modify electronic data 240 and 275 to be compatible with the impairment of the impaired user 225 and 255, as defined in the user impairment profile 212. For example, the data adjustment module 208 can include image processing software, video processing software, audio processing software, text processing software, and the like.

Alternately, instead of containing the various processing elements within the data adjustment module 208, the data adjustment module 208 can include the processors by reference like a service call. Further, the data adjustment module 208 can be configured to only locally install data processing elements that are specific to the impairment of the impaired user 225 and 255. For example, the data adjustment module 208 can locally install an audio processing element to handle audio data for a hearing-impaired user 225 and 255, and call an external image processing service, when needed, for image data.

The data adjustment module 208 can include logic for determining what types of processes need to be run upon the electronic data 240 and 275, as well as the order. Further, the data adjustment module 208 can be configured to handle electronic data 240 and 275 comprised of multiple types of data. For example, the data adjustment module 208 can be required to adjust both the video and audio tracks of a movie 240 and 275.

It should be noted that the impairment-adaptive data interaction system 200 can best operate for one impaired user 225 and 255 at a time, due to the granularity of impairment compensation. That is, compensation provided by the impairment-adaptive data interaction system 200 for one impaired user 225 can be unsatisfactory for another impaired user 255. Multiple impaired users 225 and 255 can be supported as a group provided that their impairments are relatively similar (i.e., both are red-green impaired) or non-intersecting (i.e., one visual impairment and one audial impairment).

Figure 2A:
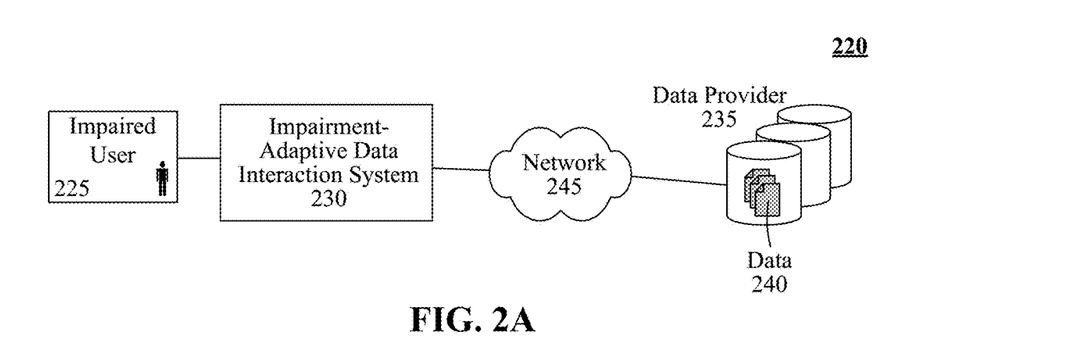
FIG. 2A is a schematic diagram of a system configuration that centralizes the functionality of the impairment-adaptive data interaction system in accordance with an embodiment of the inventive arrangements disclosed herein.
Figure 2B:
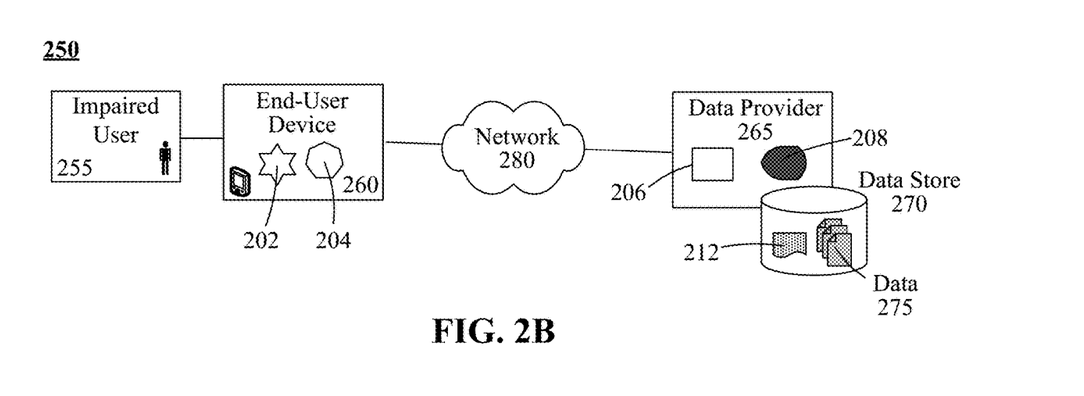
FIG. 2B is a schematic diagram of a system configuration that distributes the functionality of the impairment-adaptive data interaction system in accordance with an embodiment of the inventive arrangements disclosed herein.

System 220 of FIG. 2A can illustrate a configuration of the impairment-adaptive data interaction system 230 where its functionality is centralized to the devices of the impaired user 225. In system 220, the impaired user 225 can use the impairment-adaptive data interaction system 230 to interact with electronic data 240 received from a data provider 235 over a network 245.

The data provider 235 can represent a variety of data sources like a Web site, a Web service, or a data system. The electronic data 240 provided by the data provider 235 can take a variety of forms and/or formats like images in JPG and PNG formats.

In this example, the impairment-adaptive data interaction system 230 can represent one or more co-located electronic devices of the impaired user 225. For example, the impairment-adaptive data interaction system 230 can be a smartphone or a television connected to a laptop computer. Regardless of the quantity of devices, all components 202-208 can be supported by the impairment-adaptive data interaction system 230.

In system 250 of FIG. 2B, the components 202-208, and, thus, the functionality of the impairment-adaptive data interaction system 200 can be configured in a distributed manner. In system 250, the impaired user 255 can use an end-user device 260 having the user interaction components 202 and communications handler 204 to communicate with the data provider 265 over the network 280.

When fulfilling a data request, the data provider 265 can identify the impaired user 255 using the user identification module 206 and user impairment profile 212. The electronic data 275 can then be modified by the data adjustment module 208 prior to transmission to the end-user device 260.

System 250 can have the benefit of resource-savings for resource-constrained end-user devices 260 (i.e., processing of the electronic data 275 is performed by the data provider 265). Further, system 250 can represent a service-oriented configuration (i.e., the functionality of the data adjustment module 208 is offered as a pay-for-service of the data provider 265).

As used herein, presented data stores 210 and 270 can be a physical or virtual storage space configured to store digital information. Data stores 210 and 270 can be physically implemented within any type of hardware including, but not limited to, a magnetic disk, an optical disk, a semiconductor memory, a digitally encoded plastic memory, a holographic memory, or any other recording medium. Data stores 210 and 270 can be a stand-alone storage unit as well as a storage unit formed from a plurality of physical devices. Additionally, information can be stored within data stores 210 and 270 in a variety of manners. For example, information can be stored within a database structure or can be stored within one or more files of a file storage system, where each file may or may not be indexed for information searching purposes. Further, data store 210 and/or 270 can utilize one or more encryption mechanisms to protect stored information from unauthorized access.

Networks 245 and 280 can include any hardware/software/and firmware necessary to convey data encoded within carrier waves. Data can be contained within analog or digital signals and conveyed though data or voice channels. Networks 245 and 280 can include local components and data pathways necessary for communications to be exchanged among computing device components and between integrated device components and peripheral devices. Networks 245 and 280 can also include network equipment, such as routers, data lines, hubs, and intermediary servers which together form a data network, such as the Internet. Networks 245 and 280 can also include circuit-based communication components and mobile communication components, such as telephony switches, modems, cellular communication towers, and the like. Networks 245 and 280 can include line based and/or wireless communication pathways.

Figure 3:
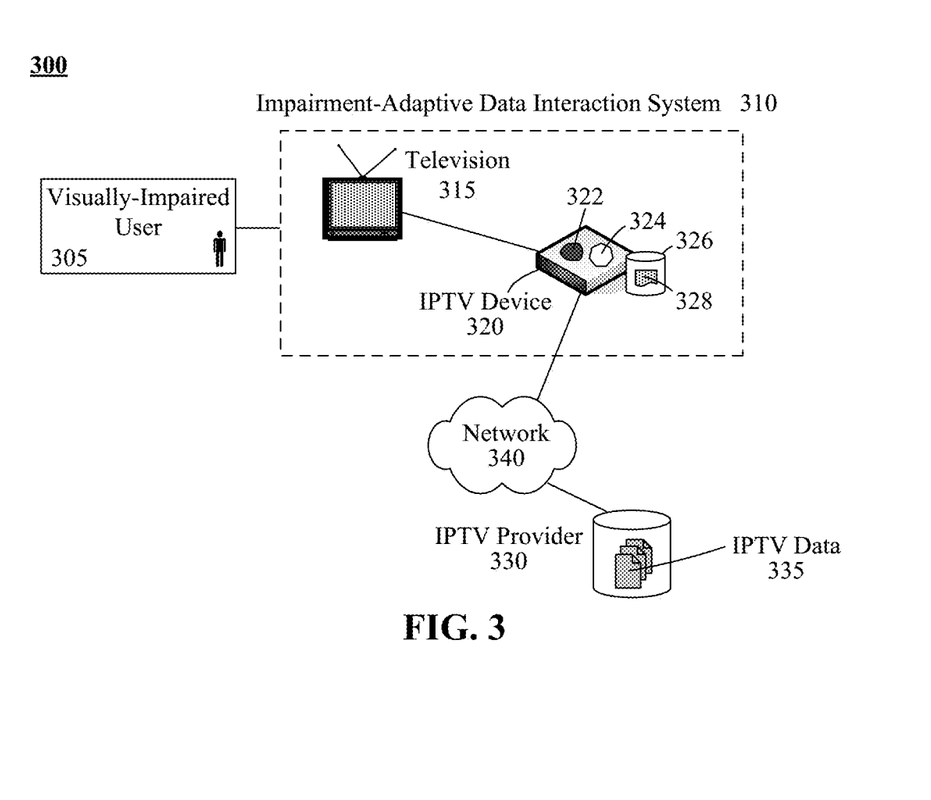
FIG. 3 is a schematic diagram of a system depicting an example embodiment of the impairment-adaptive data interaction system in accordance with an embodiment of the inventive arrangements disclosed herein.

FIG. 3 is a schematic diagram of a system 300 depicting an example embodiment of the impairment-adaptive data interaction system 310 in accordance with embodiments of the inventive arrangements disclosed herein. System 300 can be specific embodiment system 220 of FIG. 2A.

In system 300, a visually-impaired user 305 can use the impairment-adaptive data interaction system 310 to view Internet Protocol television (IPTV) data 335 from an IPTV provider 330. The visually-impaired user 305 can have a chroma-related impairment like red-green impairment. The IPTV data 335 can be video data in a full spectral range.

The impairment-adaptive data interaction system 310 can be comprised of a television 315 connected to an IPTV device or box 320. The television 315 can be included as part of the impairment-adaptive data interaction system 310 as it is used as a user interaction component for the IPTV data 335.

The IPTV device 320 can communicate with the IPTV provider 330 over the network 340, similar to a digital cable television system. The IPTV device 320 can include the data adjustment module 322, communications handler 324, and a data store 326 containing the user impairment profile 328.

In this example, the visually-impaired user 305 can be considered the only impaired user of the impairment-adaptive data interaction system 310. As such, the user identification module of the impairment-adaptive data interaction system 310 can be omitted from the IPTV device 320. However, the IPTV device 320 can be configured to handle multiple impaired users and can use various buttons or switches, like the device used to collect Nielsen rating data, as indication of the users present.

Figure 3A:
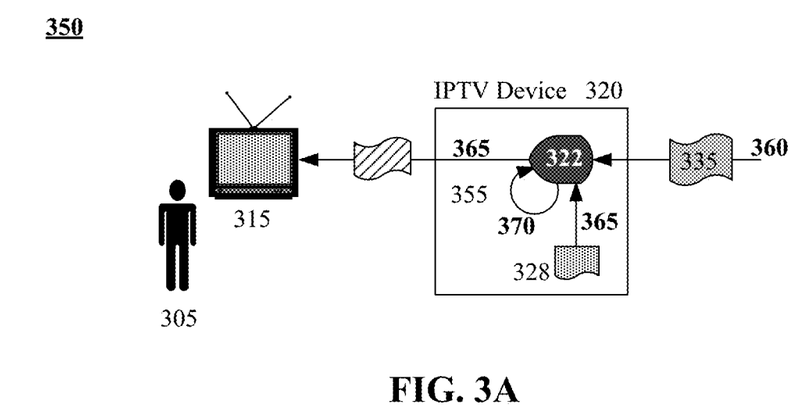
FIG. 3A is an illustrated process flow for the impairment-adaptive data interaction system in accordance with an embodiment of the inventive arrangements disclosed herein.

The actions taken by the IPTV device 320 can be further expressed in process flow 350 of FIG. 3A. The IPTV device 320 can receive 360 IPTV data 335 from the IPTV provider 330. The data adjustment module 322 can access 365 the user impairment profile 328 to determine how to process the IPTV data 335.

The data adjustment module 322 can then utilize one or more techniques to process 370 the IPTV data 335 in accordance with the user impairment profile 328. The IPTV device 320 can then convey the processed IPTV data 355 to the television 315 for presentation to the visually-impaired user 305. The visually-impaired user 305 can enjoy viewing the processed IPTV data 355 without having to make any manual modifications.

It is important to emphasize that the IPTV data 335 conveyed to the IPTV device 320 can be the same IPTV data 335 that would be provided to a user that does not have a visual impairment. Thus, because of the impairment-adaptive data interaction system 310, the visually-impaired user 305 can utilize data that they would normally not be able to without time spent in modification.

Further, use of the impairment-adaptive data interaction system 310 can decrease the need for data creators to generate multiple versions of the data to address different user impairments.

As used herein, presented data store 326 can be a physical or virtual storage space configured to store digital information. Data store 326 can be physically implemented within any type of hardware including, but not limited to, a magnetic disk, an optical disk, a semiconductor memory, a digitally encoded plastic memory, a holographic memory, or any other recording medium. Data store 326 can be a stand-alone storage unit as well as a storage unit formed from a plurality of physical devices. Additionally, information can be stored within data store 326 in a variety of manners. For example, information can be stored within a database structure or can be stored within one or more files of a file storage system, where each file may or may not be indexed for information searching purposes. Further, data store 326 can utilize one or more encryption mechanisms to protect stored information from unauthorized access.

Network 340 can include any hardware/software/and firmware necessary to convey data encoded within carrier waves. Data can be contained within analog or digital signals and conveyed though data or voice channels. Network 340 can include local components and data pathways necessary for communications to be exchanged among computing device components and between integrated device components and peripheral devices. Network 340 can also include network equipment, such as routers, data lines, hubs, and intermediary servers which together form a data network, such as the Internet. Network 340 can also include circuit-based communication components and mobile communication components, such as telephony switches, modems, cellular communication towers, and the like. Network 340 can include line based and/or wireless communication pathways.

Figure 4:
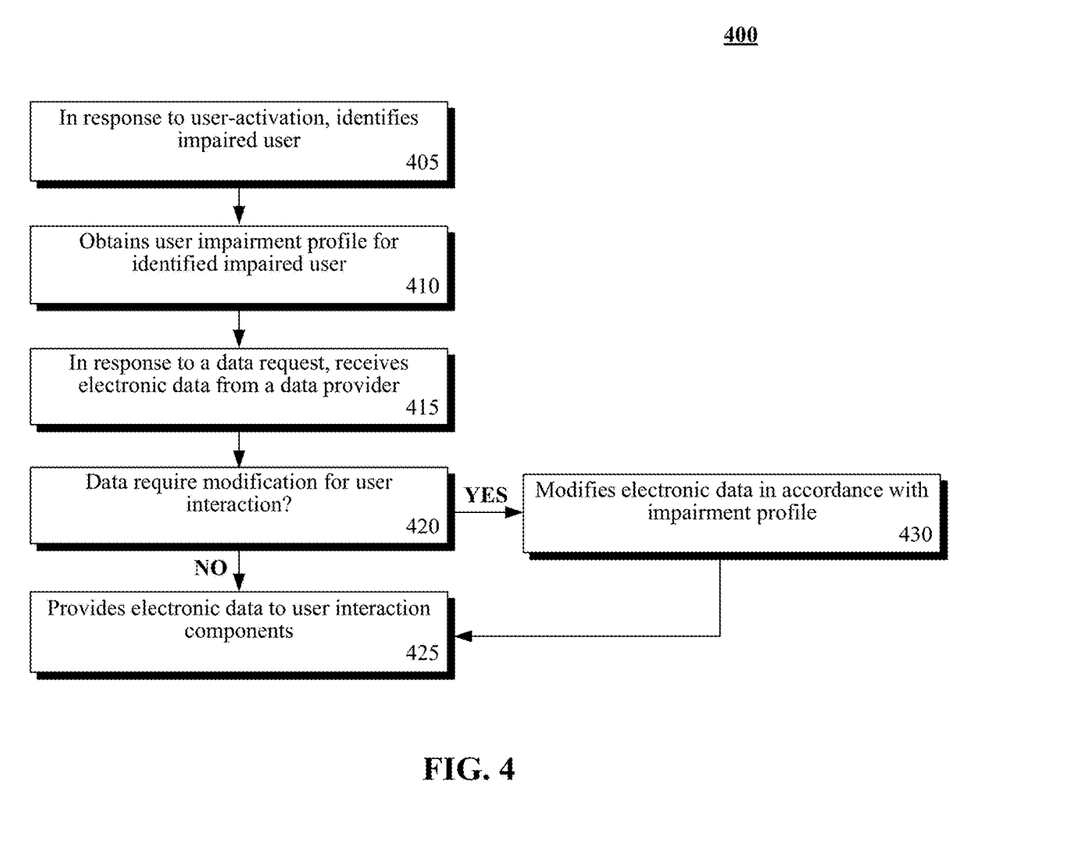
FIG. 4 is a flowchart of a method describing the general operation of the impairment-adaptive data interaction system in accordance with embodiments of the inventive arrangements disclosed herein.

FIG. 4 is a flowchart of a method 400 describing the general operation of the impairment-adaptive data interaction system in accordance with embodiments of the inventive arrangements disclosed herein. Method 400 can be performed within the context of method 100 and/or systems 220, 250, and/or 300.

Method 400 can begin in step 405 where, in response to the activation, the impairment-adaptive data interaction system can identify the impaired user. Step 405 can include the request of identifying information from the impaired user. The user impairment profile for the identified impaired user can be obtained in step 410. Depending upon the configuration of the impairment-adaptive data interaction system, the user impairment profile can be stored locally or upon a network-accessible resource.

In step 415, electronic data can be received from a data provider, in response to a data request. The data request can be generated by the impaired user or by a software application. The need for the received data to be modified for user interaction can be determined in step 420.

When the data requires modification for user interaction, step 430 can be performed where the impairment-adaptive data interaction system modifies the electronic data in accordance with the user impairment profile. After step 430 or when the data does not require modification, the electronic data can be provided to the user interaction components for further handling (e.g., presentation).

Figure 5:
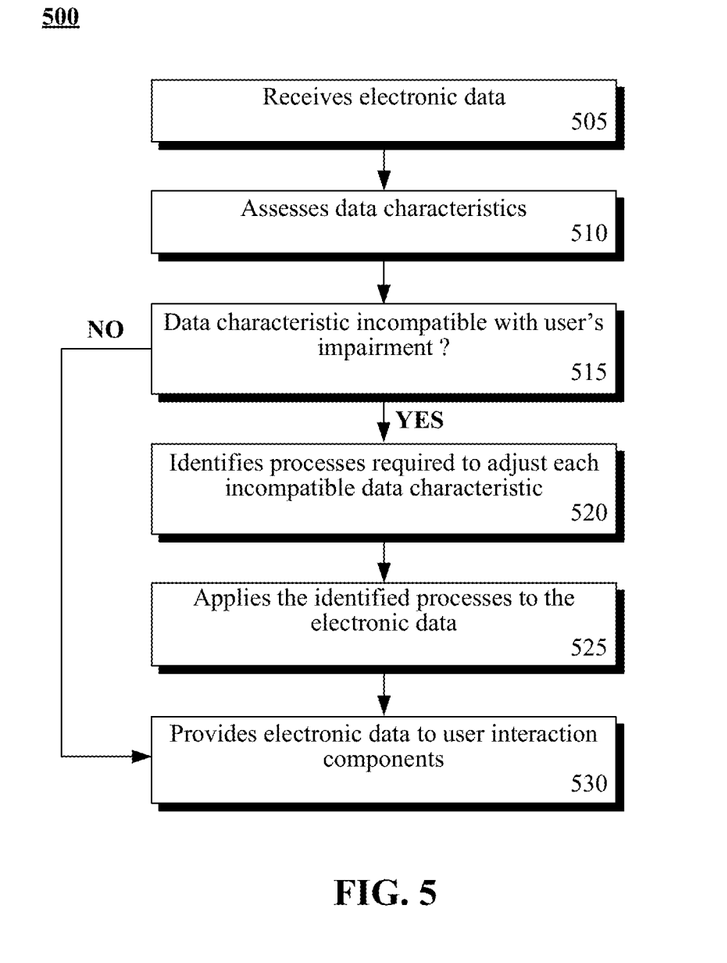
FIG. 5 is a flowchart of a method detailing operation of the data adjustment module of the impairment-adaptive data interaction system in accordance with embodiments of the inventive arrangements disclosed herein.

FIG. 5 is a flowchart of a method 500 detailing operation of the data adjustment module of the impairment-adaptive data interaction system in accordance with embodiments of the inventive arrangements disclosed herein. Method 500 can be performed within the context of methods 100 and/or 400 and/or systems 220, 250, and/or 300.

Method 500 can begin in step 505 where the data adjustment module can receive the electronic data. The characteristics of the electronic data can be assessed in step 510. In step 515, it can be determined if one or more of the characteristics of the electronic data are incompatible with the user impairment.

When one or more characteristics of the electronic data are incompatible with the user's impairment, the processes required to adjust each incompatible data characteristic can be determined in step 520. In step 525, the identified processes can be applied to the electronic data.

Upon completion of step 525 or when the electronic data does not have any characteristics that are incompatible with the user's impairment, step 530 can be performed where the electronic data can be provided to the user interaction components of the impairment-adaptive data interaction system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be handled substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method within an end-user electronic device, comprising:
    identifying an impairment that is (i) associated with a user of the end-user electronic device and (ii) defined within an impairment profile associated with the impaired user that includes:
        acceptable limit values for a plurality of data characteristics incompatible with the impairment, and
        a type of processing for handling a particular one of the plurality of incompatible data characteristics;
    receiving, from a data provider, electronic data of which a portion is incompatible with the impairment;
    automatically processing, using the type of processing included within the impairment profile, the portion of the electronic data to adjust at least one incompatible characteristic of the portion of the electronic data;
    providing the processed electronic data to the user for interaction, wherein the user is not required to make an additional modification to the processed electronic data to compensate for the impairment, and
    wherein a determination is made as to a type of electronic data having a potential to include at least one of the plurality of data characteristics included within the impairment profile and the processing is performed only for the determined type of electronic data.

2. The method of claim 1, wherein
the impairment profile is obtained based upon identification data received from the user.

3. The method of claim 1, wherein
interactions of the impaired user with electronic data are monitored, and
at least one of the acceptable limit values is determined based upon modifications made manually to the electronic data by the user.

4. The method of claim 1, wherein
interactions of the impaired user with electronic data are monitored, and
the type of processing is determined based upon modifications made manually to the electronic data by the user.

5. The method of claim 1, wherein
the portion is determined to be incompatible with the impairment using the acceptable limit values within the impairment profile.

6. An end-user electronic device, comprising:
a hardware processor configured to initiate the following executable operations:
    identifying an impairment that is (i) associated with a user of the end-user electronic device and (ii) defined within an impairment profile associated with the impaired user that includes:
        acceptable limit values for a plurality of data characteristics incompatible with the impairment, and
        a type of processing for handling a particular one of the plurality of incompatible data characteristics;
    receiving, from a data provider, electronic data of which a portion is incompatible with the impairment;
    automatically processing, using the type of processing included within the impairment profile, the portion of the electronic data to adjust at least one incompatible characteristic of the portion of the electronic data;
    providing the processed electronic data to the user for interaction, wherein the user is not required to make an additional modification to the processed electronic data to compensate for the impairment, and
    wherein a determination is made as to a type of electronic data having a potential to include at least one of the plurality of data characteristics included within the impairment profile and the processing is performed only for the determined type of electronic data.

7. The device of claim 6, wherein
the impairment profile is obtained based upon identification data received from the user.

8. The device of claim 6, wherein
interactions of the impaired user with electronic data are monitored, and
at least one of the acceptable limit values is determined based upon modifications made manually to the electronic data by the user.

9. The device of claim 6, wherein
interactions of the impaired user with electronic data are monitored, and
the type of processing is determined based upon modifications made manually to the electronic data by the user.

10. The device of claim 6, wherein
the portion is determined to be incompatible with the impairment using the acceptable limit values within the impairment profile.

11. A computer program product, comprising:
a hardware storage device having computer usable program code stored therein,
the computer usable program code, which when executed by an end-user electronic device, causes the end-user electronic device to perform:
    identifying an impairment that is (i) associated with a user of the end-user electronic device and (ii) defined within an impairment profile associated with the impaired user that includes:
        acceptable limit values for a plurality of data characteristics incompatible with the impairment, and
        a type of processing for handling a particular one of the plurality of incompatible data characteristics;
    receiving, from a data provider, electronic data of which a portion is incompatible with the impairment;
    automatically processing, using the type of processing included within the impairment profile, the portion of the electronic data to adjust at least one incompatible characteristic of the portion of the electronic data;
    providing the processed electronic data to the user for interaction, wherein the user is not required to make an additional modification to the processed electronic data to compensate for the impairment, and wherein a determination is made as to a type of electronic data having a potential to include at least one of the plurality of data characteristics included within the impairment profile and the processing is performed only for the determined type of electronic data.

12. The computer program product of claim 11, wherein the impairment profile is obtained based upon identification data received from the user.

13. The computer program product of claim 11, wherein interactions of the impaired user with electronic data are monitored, and
at least one of the acceptable limit values is determined based upon modifications made manually to the electronic data by the user.

14. The computer program product of claim 11, wherein interactions of the impaired user with electronic data are monitored, and
the type of processing is determined based upon modifications made manually to the electronic data by the user.

15. The computer program product of claim 11, wherein the portion is determined to be incompatible with the impairment using the acceptable limit values within the impairment profile.

* * * * *